Feb. 16, 1932.  W. H. PAULSON  1,845,336
MILK HANDLING DEVICE
Filed Dec. 13, 1929  4 Sheets-Sheet 1

Witnesses:
C. E. Wessel
Oscar Dopek

Inventor:
Walter H. Paulson,
By Joshua R. H. Roth
his Attorney

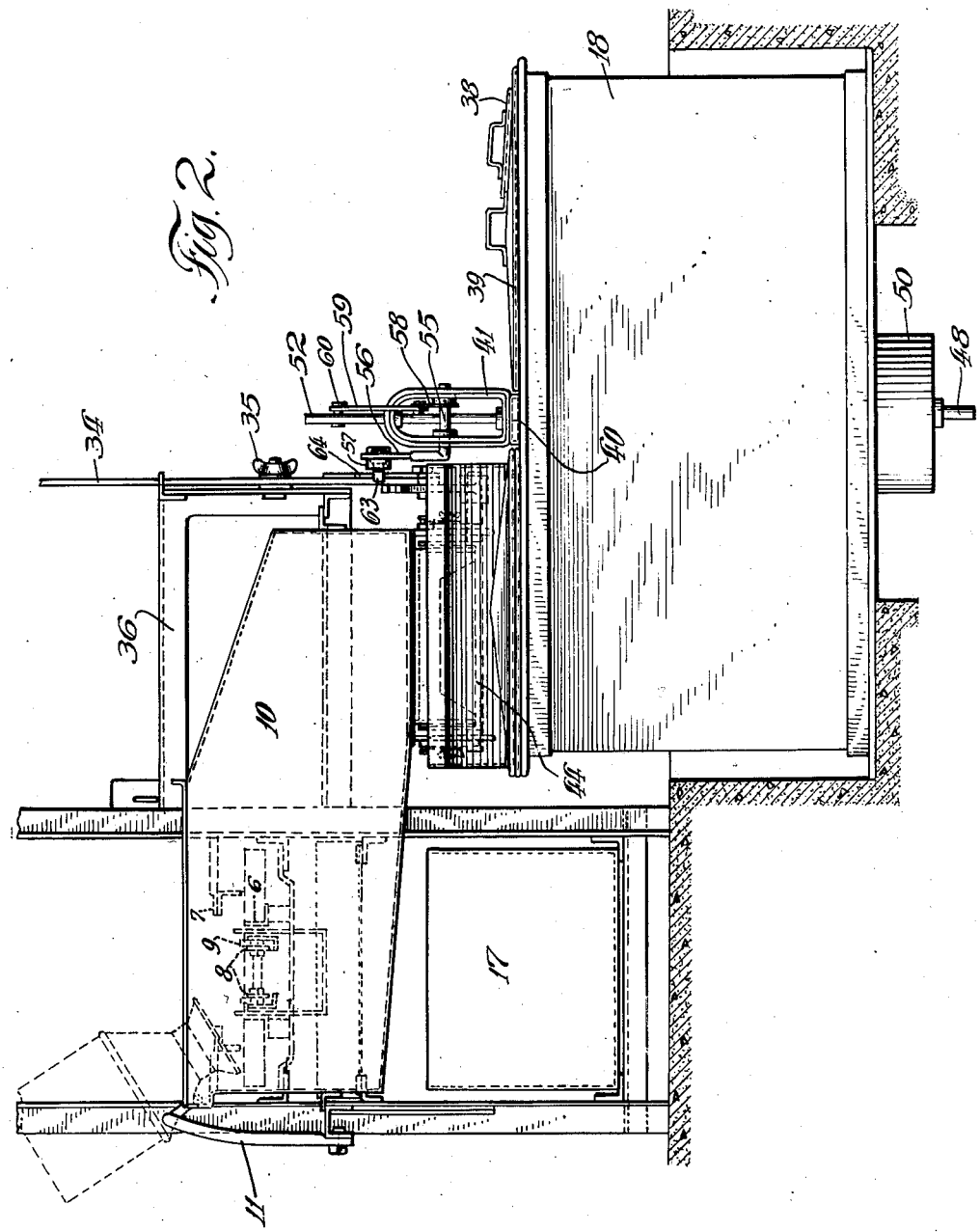

Feb. 16, 1932.  W. H. PAULSON  1,845,336
MILK HANDLING DEVICE
Filed Dec. 13, 1929   4 Sheets-Sheet 3
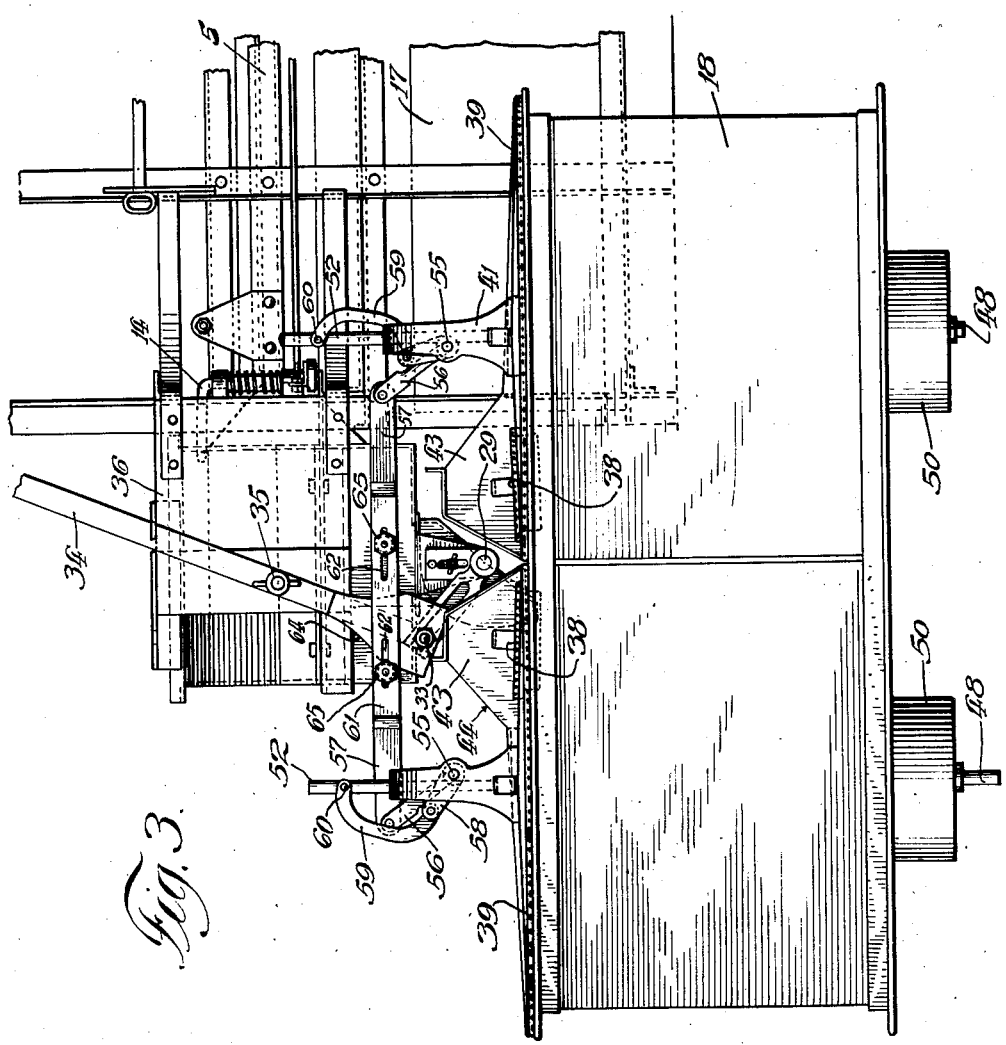

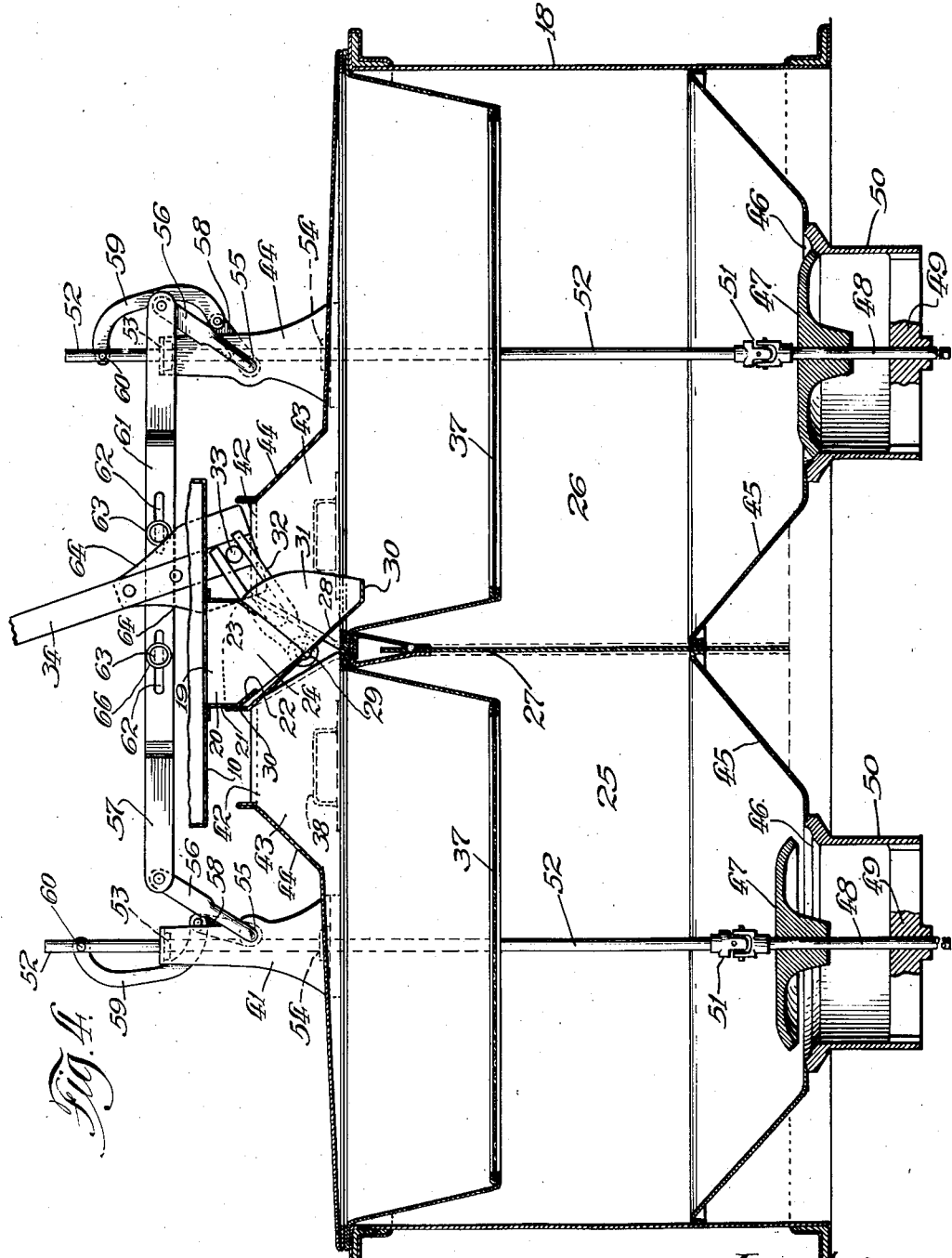

Patented Feb. 16, 1932

1,845,336

UNITED STATES PATENT OFFICE

WALTER H. PAULSON, OF CHICAGO, ILLINOIS, ASSIGNOR TO HARRY D. LATHROP, OF CHICAGO, ILLINOIS

MILK HANDLING DEVICE

Application filed December 13, 1929. Serial No. 413,797.

This invention relates to dairy machinery, and more particularly to apparatus for the first handling and treatment of the milk when it is delivered to the dairy or place of treatment from the original producers and shippers.

When the milk is delivered to the dairy or place of treatment it is first tested and checked to determine its quality and also to ascertain the quantity thereof by weight and bulk. The present invention has for its principal object to improve generally upon milk handling apparatus and to provide simple yet practical and efficient facilities and mechanism for testing, measuring and otherwise checking the milk as originally received and prior to the various treatments to which it is subjected in the course of its preparation for consumption and use.

The invention consists in the novel structure and in the several parts and combinations and arrangements of parts as hereinafter described and pointed out particularly in the appended claims.

In the accompanying drawings, illustrating a practical adaptation of the invention, Fig. 1 is a top plan view of the receiving end portion of an ordinary can washing machine, a cooperating milk dumping device, and associated milk receiving and checking means;

Fig. 2 is an end elevation of the parts shown in Fig. 1;

Fig. 3 is a side elevation thereof; and

Fig. 4 is a section, on an enlarged scale, through the milk receiving receptacle and co operating delivery portion of the milk dumping device.

Figure 1:
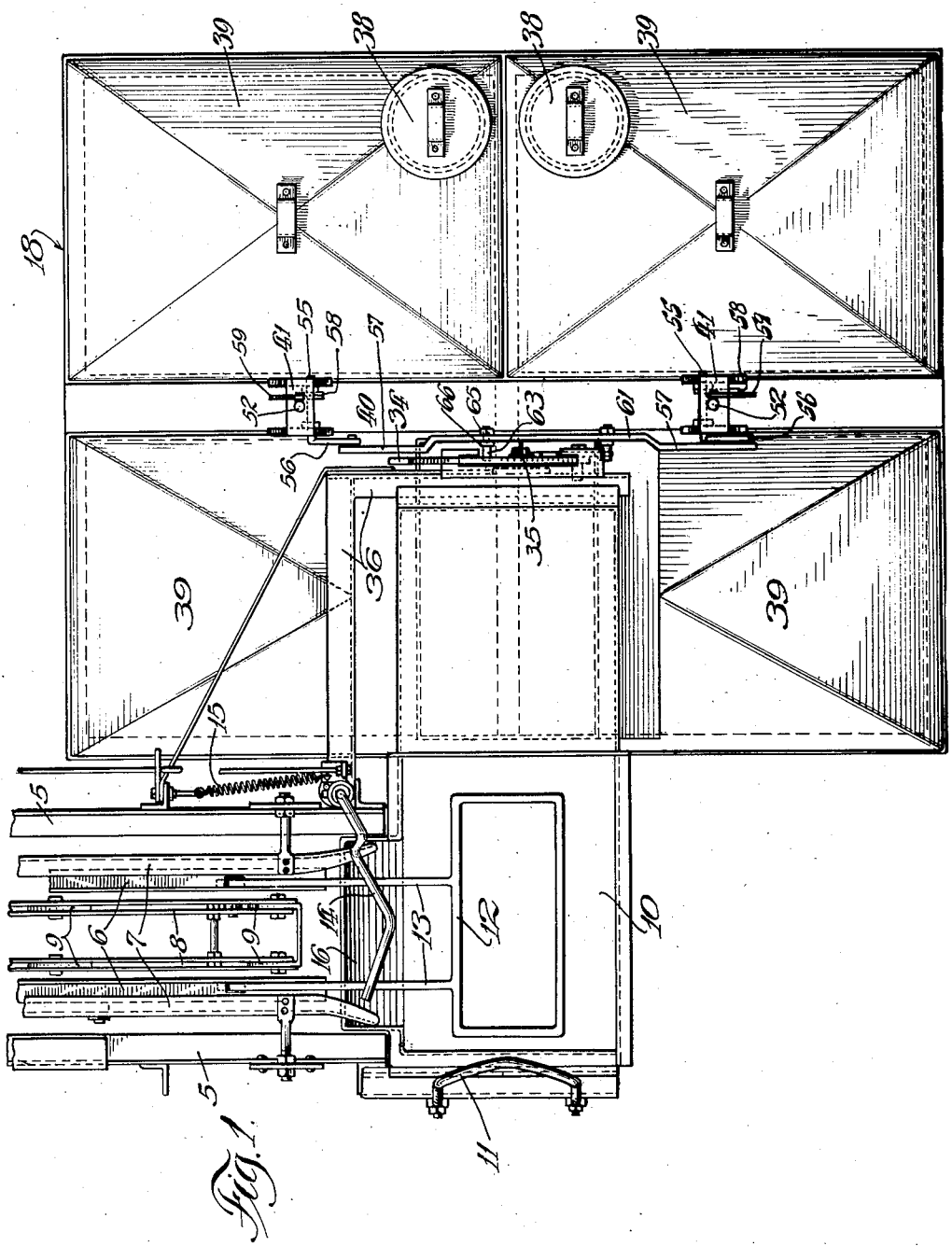

Referring now to the drawings, the numeral 5 designates generally the frame of a can washing machine of the ordinary straightaway type, said machine including a longitudinal trackway comprising the parallel rails 6, with which latter cooperate the can guides 7, said can guides comprising rails of L-shape in cross-section and having their horizontal flange portions overhanging the respective adjacent track rails 6. In practice, the cans to be cleaned are placed on the trackway in inverted position, and they are fed successively along said trackway by a feeding device, which, as shown, is of the reciprocatory type and includes the side members 8 carrying the usual dogs or pawls 9 which engage the respective cams with ratchet effect so as to intermittently move them along the trackway.

Adjacent to the receiving end of the can washing machine is a can dumping device including a hopper 10 which is provided at one end with a can tilting rack 11 over which the cans, as they are received from a suitable conveyor (not shown) usually leading from the unloading platform to the dumping device, are overturned so as to dump their contents into the hopper 10, said cans being placed in inverted position upon a rectangular open frame or rack 12, which latter is provided with a pair of horizontally extending bracket extensions 13 which are attached to the can washing machine so as to support said rack 12 in normal receiving position, and also constituting continuations of the track rails 6. By this arrangement the empty cans are moved off the rack 12 and onto the track rails 6. At the receiving end of the can washing machine, in cooperative relation to the bracket members 13 which support the rack 12, is a lever arm 14 which is yieldably held in normal position by a spring 15 and is adapted to control the actuating mechanism, this lever arm 14 being engaged by the can when the latter is moved from the rack 12 into the receiving end of the washing machine, thereby causing the actuation of the feeding mechanism in an obvious manner, but not herein set forth in detail, as the same enters into the present invention only in a general way.

At the side of the hopper 10 is a trough-like extension 16 in which the first drippings from the cans are caught and delivered to the hopper. Underlying said trough-like extension 16 and extending for some distance in the can washing machine, beneath the trackway 6, is a receptacle 17 which receives the drippings from the cans as they are moved along the trackway 6 prior to reaching that point in the machine where they are subjected to the initial cleansing treatment. The drippings received in the receptacle 17 are, obviously, recovered and utilized commercially for whatever values that are therein contained.

The bulk of the milk dumped into the hopper 10 is discharged from said hopper into the receiving and distributing tank or receptacle 18. As shown in the drawings, the hopper 10 is provided with a rectangular outlet opening 19 in its bottom, said opening being surrounded by a depending boxing 20 whose longitudinal side walls 21 are provided with inturned diagonal marginal flanges 22 and whose end walls 23 are provided with tapered wedge-like extensions 24, the apexes of said tapered end extensions being coincident with the longitudinal median vertical plane of said opening and boxing. The tank or receptacle 18 is divided into two compartments 25 and 26 by a partition wall 27, which latter is coincident with the median longitudinal vertical plane of the outlet opening of said hopper. Cooperating with the boxing 20, below the opening 19, is a reversible tilting valve member or deflector 28 which is mounted on an axle or rock shaft 29, whose axis coincides with the vertical plane of said partition wall 27 and the middle of said discharge opening 19. This member 28 comprises a plate-like body whose longitudinal marginal portions 30 are bent angularly corresponding to the angle of the marginal portions 22 of the boxing 20, said marginal portions 30 cooperating with the side walls 21 of said boxing. At the ends of said member 28 are perpendicular segmental portions 31 which cooperate with the adjacent end walls 23 of the boxing and the extensions 24 thereof.

The axle or shaft 29 is provided with a bifurcated lever arm 32 which has an operable engagement with a stud or roller 33 provided therefor on an oscillatory actuating lever 34, which latter is pivoted, as at 35, to a frame 36 extending from the frame of the can washing machine into proximity to the end portion of the hopper 10 of the milk dumping device. By this arrangement the valve member or deflector 28 may be tilted to cooperate with either side of the boxing 20 so as to direct the milk discharged from the hopper 10 through the opening 19 into either of the compartments 25 or 26, as may be desired.

In the upper portions of the two compartments 25 and 26, in the region adjacent to the boxing 20 of the discharge opening 19 of the hopper and the cooperating valve member or deflector 28, are strainers 37 through which the milk is passed as it enters the respective compartments of the tank or receptacle 18. The milk after its reception in the tank or receptacle 18 may be tested as to its quality and otherwise checked to ascertain the quantity thereof, as well as other necessary determinations. By dividing the tank into separate compartments this work is greatly facilitated, in that by providing means for delivering the milk from the hopper of the dumping device into either compartment at will, the milk from one producer or shipper may be delivered into one of the compartments 25 or 26, as the case may be, and, after the usual sample has been taken for test purposes and the milk otherwise checked, and while said compartment is being emptied of its contents the milk from another producer or shipper may be delivered into the opposite compartment.

For the purposes of obtaining samples of the milk from the tank or receptacle 18, relatively small supplemental removable covers 38 are provided in the respective larger covers 39 of the tank or receptacle, said covers 39 being preferably removable. Preferably, there are two of the said covers 39 for each of the compartments, and extending across the middle of the tank or receptacle 18, between the respective pairs of cover members 39, is a permanent cover plate 40, said cover portion 40 affording a supporting base for standards 41, said standards, as shown, being in the form of open frames or yokes for the mounting of reciprocatory valve stems and the actuating mechanism therefor, to be later described.

In two opposed cover members 39, being one of each pair thereof above described, are openings 42 with which said valve member or deflector 28 alternately cooperates, said openings being provided with opposite vertical side walls 43 and inclined outer walls 44 which serve as guards in correlation to the end wall portions 31 of the valve member or deflector 28 when the milk is delivered into either of the compartments 25 or 26, as the case may be. By this arrangement it is obvious that the milk may be readily delivered at will into either of the compartments 25 or 26 without liability of loss by spilling it on the outside of the cover of the tank or receptacle 18.

Each of the compartments 25 and 26 has a central hopper bottom portion 45 which is provided with an outlet opening 46 controlled by a valve member 47. Preferably, provision is made whereby the valve element in one of the compartments is in closed position while the valve member in the opposite compartment is opened, and, in this connection, actuating means is provided so as to be operable in conjunction with the actuation of said valve element or deflector 28. As shown, each of the valve members 47 is provided with a downwardly extending stem portion 48 which slides through a bore in the hub portion of a spider frame 49, which latter is located in a cylindrical extension 50 depending from the hopper bottom 45 and surrounding the outlet opening 46 thereof. The stem portion 48 extends upwardly through the hub portion of the valve member 47 and is connected, preferably by a universal joint 51, to a reciprocatory carrier and actuator stem or rod 52, which latter is slidable in guide portions 53 and 54, respectively, at the top and bottom of said standards 41.

Journaled transversely in the standards 41 are the horizontal portions 55 of L-shaped rocking levers 56, said levers 56 being pivotally connected at their outer ends by a tie bar or link 57, whereby said levers are movable the one by the other. Fixedly secured on each of the rocking lever portions 55 is an arm 58 which has pivotally attached thereto one end of a link member 59 whose opposite end portion is pivotally attached to the carrier and actuator stem 52, as at 60. As shown, the link 59 has its middle portion offset from its end portions so as to clear the top portion of the standard 41 at all times during the actuation of the valve members 47 and in the open and closed positions of the latter, as will presently more fully appear.

The lever arms 58 are respectively set angularly on the portions 55 of the levers 56 so that when one of the valve members 47 is seated to close the opening 46 in the hopper bottom of one of the compartments 25 or 26 of the tank or receptacle 18, as shown to the right in Fig. 4 of the drawings, its particular lever arm 58 is swung to an angle considerably past dead center at one side of the axis of said stem portion 52, at which time the valve member 47 in the opposite compartment is in opened position, it being so held by the arm 58 on its correlated lever 56, said arm 58 being moved past dead center in the same direction as the arm 58 on the opposite lever member 56 but only to a slight degree, which, however, is sufficient to afford a locking support for the particular valve member 47 in its open position.

The cross-connecting link 57 is provided with an offset middle portion 61 having a pair of longitudinal slots 62, in which slotted portions laterally projecting abutment members 63, in the form of shouldered studs, are adjustably mounted. Between these abutment members 63 the lower end portion of the actuating lever 34 works, said lever having cam projections or wings 64 on its opposite sides which respectively engage said abutment members 63, whereby the connecting link 57 is oscillated so as to cause the simultaneous actuation of the lever members 56 in either direction and thereby simultaneously operate the valves 47 and the valve member or deflector 28. In order to secure the proper cooperative action between the cross-connecting link 57 and the cam portions 64 of the actuating lever 34, the abutment studs 63 are readily adjustable in the slots 62, said studs being releasably secured in their respective adjusted positions by nuts 65 which impinge the face of the link 57 opposite that which the shouldered portions 66 of the studs engage. By this arrangement a positive actuation of the valve members 47 simultaneously with the actuation of the valve member or deflector 28 is effected and yet a limited up and down movement of the tank or receptacle 18 with respect to the milk receiving hopper of the dumping device is permitted so that, if desired, the tank or receptacle 18 may be supported on the vertically movable platform of a weighing scale or upon a specially provided vertically movable support having an operable connection with a weighing scale so that, in addition to testing the quality of the milk contained in the tank, its weight may also be ascertained. It will be understood, of course, that the discharge outlets at the bottoms of the respective tank compartments 25 and 26 may be in direct or indirect communication with the other receptacles or parts of the apparatus where further treatment of the milk occurs.

Obviously, the structure may be modified in many respects without in the least departing from the spirit and scope of the invention as defined by the appended claims. The invention, therefore, is not limited to the specific construction and arrangement shown in the accompanying drawings.

Having thus described my invention, what I claim as new and desire to secure by Letters Patent is:

1. In an apparatus of the character described, a receiving and distribution receptacle divided into separate compartments, each of said compartments having an outlet opening at the bottom thereof, reciprocatory valve members respectively controlling the outlet openings of said receiving and distribution receptacle, said valve members having operating stems extended above the top of said receptacle, a rocking lever correlated to each of said valve stems, said lever provided with an arm having a pivotal link connection with its correlated valve stem, a link cross-connecting said rocking levers whereby to actuate the same in unison and in opposite directions, the respective valve stem connected arms of said rocking levers being arranged so that when the cross-connecting link is moved in either direction they are off center in that same direction with respect to the axes of the stems of the outlet controlling valves of said receiving and distribution receptacle, whereby one of said valves is permitted to close and remain seated by gravity and the other of said outlet controlling valves is supported in open position, a milk dumping device having a discharge outlet overhanging said receiving and distribution receptacle and medially coincident with the vertical plane of the dividing partition of said receptacle, a reversible deflector cooperating with the discharge outlet of said dumping device and being tiltable about an axis coincident with the medial plane of said discharge opening and the dividing partition of said receiving and distribution receptacle whereby to deliver the discharged contents of said dumping device into either of the compartments of said receptacle, and means for oscillating said deflector about its axis so as to deliver the discharged contents from said dumping device into either of the compartments of said receptacle and simultaneously actuating the cross-connecting link of said rocking levers for said outlet controlling valves whereby to close the controlling valve of one compartment of said receiving receptacle and at the same time open the outlet controlling valve of the other compartment of said receptacle.

2. In an apparatus of the character described, a receiving and distribution receptacle divided into separate adjoining compartments, each of said compartments having an outlet opening at the bottom thereof, vertically movable gravitating valve elements respectively controlling said outlet openings, each of said valve members having a vertically reciprocating stem, a rocking lever correlated to each of said stems and being provided with an arm having a pivotal link connection with its correlated valve stem, a link pivotally cross-connecting said rocking levers, said rocking levers and their linked arm connections with the respective valve stems being arranged so that the valve member of the one compartment is in closed position while the valve member of the other compartment is in open position, means for reciprocating said cross-connecting link comprising an actuating lever, a dumping device having a discharge outlet disposed above said receiving and distribution receptacle and medially coincident with the division wall thereof, and a reversible deflector in cooperative relation to the discharge opening of said dumping device and being tiltable about an axis coincident with the medial plane of said discharge opening, whereby to deliver the discharged contents of said dumping device into either of the compartments of said receiving and distribution receptacle, said deflector being operably connected to said actuating lever whereby to be actuated simultaneously with the reciprocation of said cross-connecting link of the rocking levers which actuate the outlet controlling valves of the respective compartments of said receiving and distribution receptacle.

3. In an apparatus of the character described, a receiving and distribution receptacle divided into separate compartments, each of said compartments having an outlet opening at the bottom thereof, said openings being respectively controlled by gravitating valve members, each of said valve members having a vertically reciprocating stem, a rocking lever correlated to each of said stems, and having an operable connection therewith, a link pivotally cross-connecting said rocking levers whereby to simultaneously actuate them, said rocking levers being operable to positions in opposite directions beyond the plane of the axes of the respective valve stems, whereby the valve member of the one receptacle compartment is lowered to closed position with respect to the outlet opening of said compartment, and the valve member of the other compartment is raised and supported in open position with respect to its particular opening, and means for reciprocating the cross-connecting link of said rocking levers.

4. In an apparatus of the character described, a receiving and distribution receptacle divided into separate compartments, each of said compartments having an outlet opening at the bottom thereof, said openings being respectively controlled by gravitating valve members, each of said valve members having a vertically reciprocating stem, a rocking lever correlated to each of said stems, and having an operable connection therewith, a link pivotally cross-connecting said rocking levers whereby to simultaneously actuate them, said rocking levers being operable to positions in opposite directions beyond the plane of the axes of the respective valve stems, whereby the valve member of the one receptacle compartment is lowered to closed position with respect to the outlet opening of said compartment, and the valve member of the other compartment is raised and supported in open position with respect to its particular opening, and means for reciprocating the cross-connecting link of said rocking levers, said means comprising adjustable spaced abutments on said connecting link and an actuating lever interposed between said abutments and having cam portions at opposite sides thereof engageable alternately with said abutments.

In testimony whereof I have signed my name to this specification.

WALTER H. PAULSON.